(12) United States Patent
Ishida et al.

(10) Patent No.: US 7,913,824 B2
(45) Date of Patent: Mar. 29, 2011

(54) DISK BRAKE DEVICE

(75) Inventors: Shinichiro Ishida, Saitama (JP); Kenji Kofuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 81 days.

(21) Appl. No.: 12/393,657

(22) Filed: Feb. 26, 2009

(65) Prior Publication Data

US 2009/0242338 A1 Oct. 1, 2009

(30) Foreign Application Priority Data

Mar. 27, 2008 (JP) ................................. 2008-084899

(51) Int. Cl.
*F16D 65/14* (2006.01)
(52) U.S. Cl. .................................... 188/352; 188/106 R
(58) Field of Classification Search .................. 188/26, 188/72.4, 106 R, 345, 352; 303/9.61–9.74
See application file for complete search history.

(56) References Cited

U.S. PATENT DOCUMENTS 3,547,233 A * 12/1970 Girvan ........................... 188/170
3,789,961 A * 2/1974 Warwick ....................... 188/345
2008/0236961 A1* 10/2008 Toyoda ...................... 188/106 R
2009/0243377 A1* 10/2009 Kofuji et al. .................. 303/9.64

FOREIGN PATENT DOCUMENTS

JP 3881756 B2 11/2006

* cited by examiner

*Primary Examiner* — Christopher P Schwartz
(74) *Attorney, Agent, or Firm* — Birch, Stewart, Kolasch & Birch, LLP (57) ABSTRACT

A vehicular disk brake device having a first air discharge mouth and a first hose connection mouth connected to a center cylinder project from an outer face of the caliper case in close proximity and so that the axes of the first hose connection mouth and the first air discharge mouth are parallel. In addition, a difference of elevation h1 is provided on both tip end faces so that the tip end face of the first air discharge mouth is higher than the tip end face of the first hose connection mouth. Since an elevation difference h1 is provided on both tip end faces so that the tip end face of the first air discharge mouth is higher than the tip end face of the first hose connection mouth, obstructing components about an air valve mounted on the first air discharge mouth are avoided.

17 Claims, 5 Drawing Sheets

DISK BRAKE DEVICE

CROSS-REFERENCE TO RELATED APPLICATION

The present application claims priority under 35 U.S.C. §119 to Japanese Patent Application No. 2008-084899, filed Mar. 27, 2008, the entire contents of which are hereby incorporated by reference.

BACKGROUND OF THE INVENTION

1. Field of the Invention

The present invention relates to a disk brake device suitable for a motorcycle.

2. Description of Background Art

A motorcycle provided with a caliper having three cylinders in parallel is known (for example, refer to JP Patent No. 3881756 (FIGS. 3-5).

A disk brake device is shown in FIG. 3 of Patent Document 1. In the description hereafter, reference numerals in brackets are the same as those shown in JP Patent No. 3881756 (FIGS. 3-5).

Cylinders (13), (14), (15) housing three pistons (20), (21), (22) are provided on a caliper body (12). The cylinder (13) and the cylinder (15) are connected by a first hydraulic passage (a1). The cylinder (15) is connected with an external section by a second hydraulic passage (a2). The cylinder (14) is connected with an external section by a third hydraulic passage (b). In other words, a brake hose is connected to the second hydraulic passage (a2) and the third hydraulic passage (b).

Figure 4:
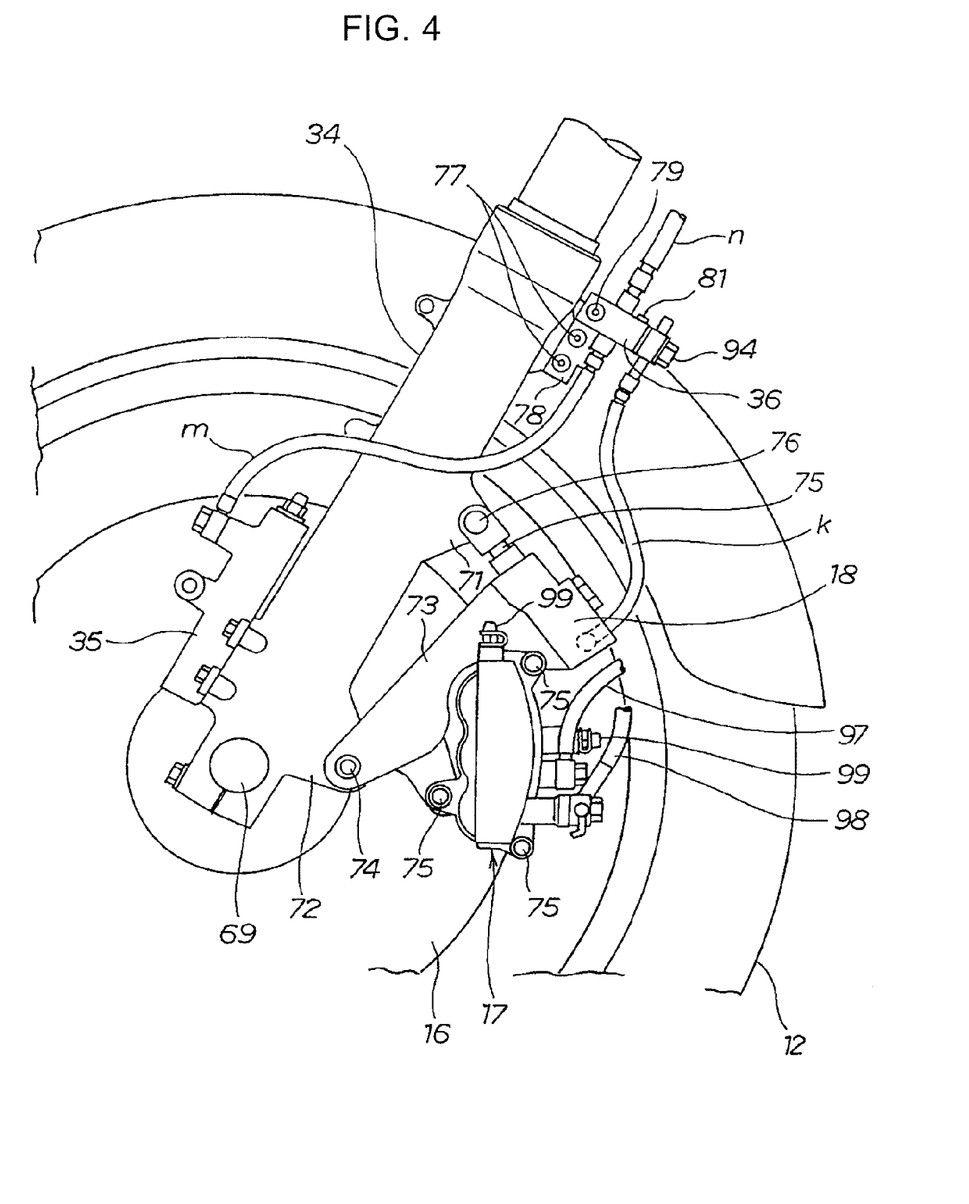
FIG. 4 is a left view of a front wheel.

As shown in FIG. 4, the third hydraulic passage (b) inclines. Although the reference numeral is omitted, a projection can be seen forming the second hydraulic passage (a2) in the back of the third hydraulic passage (b).

Figure 5:
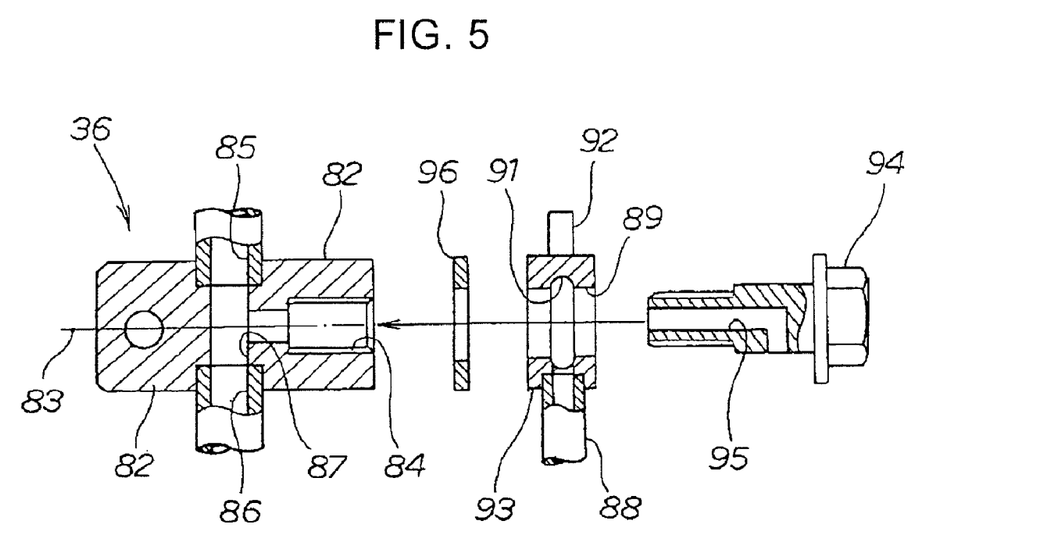
FIG. 5 is a sectional view of the three-way mouth coupling.

As shown in FIG. 5, the second hydraulic passage (a2) is provided closer to the disk plate (18) than the third hydraulic passage (b).

Figure 3:
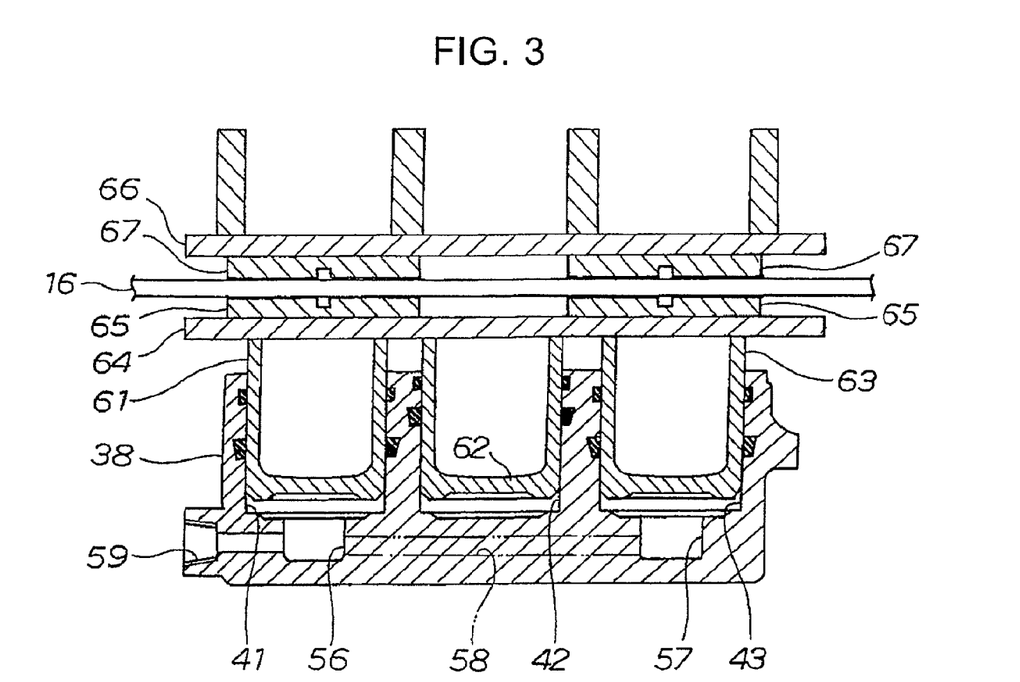
FIG. 3 is a sectional view along the line 3-3 in FIG. 2.

The cylinder (14) must be connected to the air discharge (reference numeral omitted) so that the center cylinder (14) is smoothly filled with brake fluid. As shown in FIG. 3, the air discharge, third hydraulic passage (b) and second hydraulic passage (a2) are provided in relative proximity on the caliper body (12). When the air discharge is opened or closed using a wrench, an operation must be performed on the third hydraulic passage (b) and second hydraulic passage (a2) by threadably connecting one end of the brake hose with a tool. The operation is obstructed when the wrench or tool interferes with nearby brake hoses.

In the past, the air discharge, third hydraulic passage (b) and second hydraulic passage (a2) were relatively inclined. Thus interference of the wrench or the tool could be avoided by relatively inclining these components.

However when the air discharge, third hydraulic passage (b) and second hydraulic passage (a2) were relatively inclined, the caliper body (12) must be inclined with respect to a drill and a complicated operation is required to open holes with respect to the air discharge, third hydraulic passage (b) and second hydraulic passage (a2) in order to adjust the angle of inclination. Consequently the number of operations is increased.

As a result, there is a need for a caliper structure to reduce the hole opening operations.

SUMMARY AND OBJECTS OF THE INVENTION

The present invention has the object of providing a caliper structure reducing the hole opening operation.

According to an embodiment of the present invention, a disk brake device disposes three cylinders in parallel on a caliper of a disk brake. The cylinders are provided with pistons pressing a brake pad onto a disk plate. A first air discharge and a first brake hose are connected to a center cylinder. A second air discharge and a second brake hose are connected to side cylinders on both sides. A first hose connection mouth connecting the first brake hose and a first air discharge mouth connecting the first air discharge projecting from an outer face of the caliper are in close proximity so that the axis of the first hose connection mouth and the axis of the first air discharge mouth are arranged in parallel. A difference in elevation is provided on both tip end faces so that the tip end face of the first air discharge mouth is higher than the tip end face of the first hose connection mouth.

According to an embodiment of the present invention, an air valve is threadably engaged with the first air discharge mouth which closes when tightened and opens when loosened, and a tool engagement section is in a higher position than the tip end face of the first air discharge mouth.

According to an embodiment of the present invention, the tool engagement section is formed in a hexagonal shape in order to allow engagement of a wrench.

According to an embodiment of the present invention, when the front side cylinder and the rear side cylinder comprising the side cylinders on both sides are viewed from the side in alignment, the front side cylinder and the rear side cylinder are connected by a connection passage, and a second air discharge discharging air from the connection passage projects in a forward direction from the caliper at a position forward of the front side cylinder.

Effects of the invention include the following:

According to an embodiment of the present invention, since the axis of the first hose connection mouth and the axis of the first air discharge mouth are parallel to one another, the hole opening operation on the two mouths can be performed at a fixed caliper angle. Thus the operations for hole opening are reduced.

Furthermore since a difference in elevation is provided on both tip end faces so that the tip end face of the first air discharge mouth is higher than the tip end face of the first hose connection mouth, no obstructions are present around the air valve mounted on the first air discharge mouth. As a result, the air valve can be easily operated, air discharge operations performed when filling brake fluid can be performed smoothly and thus brake fluid filling operations are simplified.

According to an embodiment of the present invention, a tool engagement section is in a higher position than the tip end face of the first air discharge mouth. Thus there is no obstruction around the tool engagement section. As a result, the air valve can be easily operated, air discharge operations performed when filling brake fluid can be performed smoothly and thus brake fluid filling operations are simplified.

According to an embodiment of the present invention, the tool engagement section is formed in a hexagonal shape in order to allow engagement of a wrench. A wrench is a normal tool and has a low price in comparison to specialist tools.

According to an embodiment of the present invention, the performance of the second air discharge is improved by simply mounting the primary caliper to be inclining or vertical and so that the second air discharge is higher.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 shows arrangement of the primary caliper and the hoses and the like.

DETAILED DESCRIPTION OF THE PREFERRED EMBODIMENTS

The invention will be described hereafter with reference to the attached figures. The dimensions "transverse and longitudinal" are determined by making reference to the position of a driver.

Figure 1:
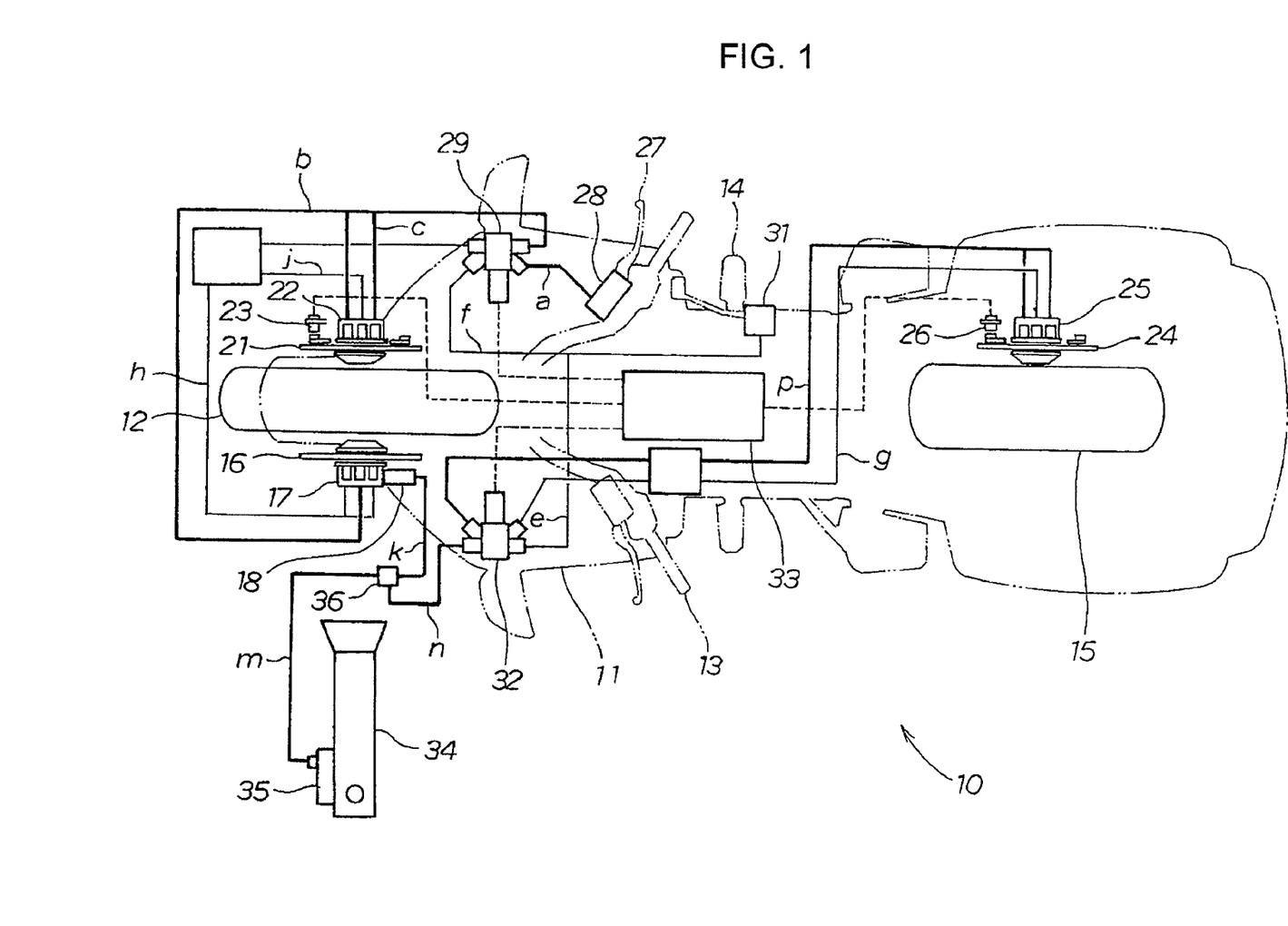
FIG. 1 shows a disk brake device for a motorcycle according to the present invention.

FIG. 1 shows a disk brake device for a motorcycle according to the present invention. The motorcycle 10 is provided with a front wheel 12 and handlebars 13 on a front section of the vehicle body 11 as shown by the outline, a brake pedal 14 is provided on the right side of the center section and a rear wheel 15 is provided on a rear section.

A first disk plate 16 is attached on the left side of the front wheel 12. A primary caliper 17 faces a first disk plate 16. A secondary master cylinder 18 is disposed in proximity to the primary caliper 17.

A second disk plate 21 is attached on the right side of the front wheel 12. A second caliper 22 faces the second disk plate 21. A front-wheel pulse pickup 23 is disposed to detect the rotation speed of the front wheel 12.

A third disk plate 24 is attached on the right side of the rear wheel 15. A secondary caliper 25 faces the third disk plate 24. A rear-wheel pulse pickup 26 is disposed to detect the rotation speed of the rear wheel 15.

The calipers 17, 22, 25 are each provided with three cylinders. The middle cylinder is termed the center cylinder with the remaining cylinders termed side cylinders.

When the brake lever 27 provided on the handlebars 13 is gripped, the hand brake master cylinder 28 develops a hydraulic pressure. This hydraulic pressure is transferred to the side cylinders of the second caliper 22 and the center cylinder of the primary caliper 17 via a hydraulic passage a, front modulator 29 and hydraulic passages b, c thereby creating a braking condition in the front wheel 12.

When the brake pedal 14 is depressed, a hydraulic pressure is produced by the foot brake master cylinder 31. This hydraulic pressure is supplied to the front modulator 29 and the rear modulator 32 via hydraulic passages e, f, transferred to the center cylinder of the secondary caliper 25 from the rear modulator 32 through a hydraulic passage g thereby creating a braking condition in the front wheel 12. In the same manner, the front wheel 12 is placed in a braking condition by transferring the hydraulic pressure from the front modulator 29 through hydraulic passages h, j to a side cylinder of the primary caliper 17 and a center cylinder of the second caliper 22.

This motorcycle 10 is also provided with an ABS (anti lock system). In other words, the rotation speed of the vehicle wheels is detected by a front-wheel pulse pickup 23 and a rear-wheel pulse pickup 26, a control unit 33 receiving the information detected by the pickups 23 and 26 controls a front modulator 29 to adjust the braking amount on the front wheel 12 and controls the rear modulator 29 to adjust the braking amount on the rear wheel to avoid producing a vehicle wheel lock phenomenon.

The motorcycle 10 is provided with an anti-dive device 35 on a lower section of the left front fork 34. The anti-dive device 35 plays a role of operating when the front wheel 12 is in a braking condition to limit the dip of the front section of the vehicle body.

The anti-dive device 35 receives a hydraulic pressure via hydraulic passages k, m from the secondary master cylinder 18. A part of the hydraulic pressure produced by the secondary master cylinder 18 is transferred to the side cylinders of the secondary caliper 25 via a hydraulic passage k, three-way mouth coupling 36 and hydraulic passages n, p thereby creating a braking condition in the rear wheel 15.

The primary caliper 17, the second caliper 22 and the secondary caliper 25 may be formed from identical components. The structure of the primary caliper 17 will be described hereafter. Description of the structure of the second caliper 22 and the secondary caliper 25 will be omitted.

Figure 2:
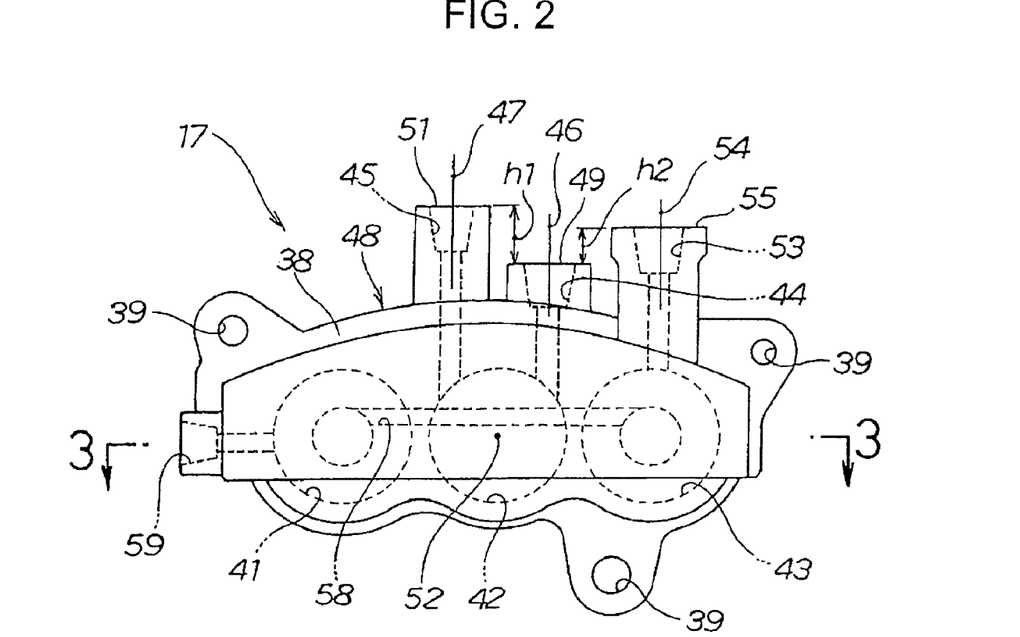
FIG. 2 is a front view of a caliper according to the present invention.

FIG. 2 is a front view of a caliper according to the present invention. In a caliper case 38 of a primary caliper 17, a plurality of bolts holes 39 are disposed on the edge and three cylinders comprising a front side cylinder 41, a center cylinder 42 and a rear side cylinder 43 are disposed in parallel.

A first hose connection mouth 44 and a first air discharge mouth 45 connected to the center cylinder 42 projecting from an outer face 48 of the caliper case 38 are in close proximity so that the axis 46 of the first hose connection mouth 44 and the axis 47 of the first air discharge mouth 45 are arranged in parallel.

In addition, a difference of elevation h1 is provided on both tip end faces 49, 51 so that the tip end face 51 of the first air discharge mouth 45 is higher than the tip end face 49 of the first hose connection mouth 44. The height is determined in reference to the height from the center 52 of the center cylinder 42.

Preferably, the second hose connection mouth 53 connected to the rear side cylinder 43 is provided to project from near to the outer face 48 of the caliper case 38 so that the axis 54 of the second hose connection mouth 53 is parallel to the axis 46 of the first hose connection mouth 44. A difference of elevation h2 is provided on both tip end faces 49, 55 so that the tip end face 55 of the second air connection mouth 53 is higher than the tip end face 49 of the first hose connection mouth 44.

FIG. 3 is a sectional view along the line 3-3 in FIG. 2. A recess 56 is provided in the back of the front side cylinder 41 and a recess 57 is provided in the back of a rear side cylinder 43. A connection passage 58 connects the recesses 56, 57. The second air discharge mouth 59 which discharges air from the connection passage 58 is disposed forward of the rear side cylinder 41.

A brake pad 64 is pressed by pistons 61, 63 engaged in both side cylinders 41, 43. A lining 65, 65 attached to the brake pad 64 is pressed onto a first disk plate 16.

A braking effect is applied to the first disk plate 16 by sandwiching the disk plate 16 with another lining 67, 67 attached to the brake pad 66 and the front lining 65, 65.

A braking effect is applied to the first disk plate 16 even when the brake pad 64 is pressed by the piston 62 engaged with the center cylinder 42.

FIG. 4 is a left view of a front wheel. A projecting section 71, 72 which overhangs rearwardly is integrally formed on the lower end of the front fork 34. A lower end of the caliper bracket 73 supporting the primary caliper 17 is pivotally supported on the projecting section 72 in proximity to the axle 69 at a low position. The caliper bracket 73 is mounted to swing in a longitudinal direction (right and left in the figure) about a pin 74.

The primary caliper 17 is fixed for example by three bolts 75 to the caliper bracket 73. A secondary master cylinder 18 is integrally formed to the upper section of the caliper bracket 73. A plunger shaft 75 extending from the secondary master cylinder 18 is connected by a pin 76 to the projecting section 71 near to the front fork 34.

In the figure, when a braking force is applied to the primary caliper 17, braking torque swings the primary caliper 17 about the pin 74 in an anticlockwise direction in the figure to the first brake plate 16 which is rotating in an anticlockwise direction. The plunger shaft 75 displaces in a compressing direction and produces a hydraulic pressure.

The hydraulic pressure is supplied to the three-way mouth coupling 36 through a hose forming a hydraulic passage k. The inner structure of the three-way mouth coupling 36 will be described hereafter.

A holder 78 is fixed by bolts 77, 77 to the front forks 34. The three-way mouth coupling 36 is mounted in the holder 78 by a bolt 79. The holder 78 is provided with an engaging claw 81 which prevents rotation. Consequently the three-way mouth coupling 36 can be fixed using only one bolt 79.

A portion of the hydraulic pressure from the three-way mouth coupling 36 is supplied to the anti-dive device 35 through a hose forming a hydraulic passage m. The remainder of the hydraulic pressure is supplied to the outside through a hose forming a hydraulic passage n. The passages k, m, n are shown in FIG. 1.

In other words, a hose forming a hydraulic passage k extends from the secondary master cylinder 18. The tip of the hose is connected to a mouth of the three-way mouth coupling 36 fixed to the front forks 34. One end of the hose (lower end) is supported by the secondary master cylinder 18 and the other end (upper end) is supported by the three-way mouth coupling 36. Thus the hose clamps may be omitted, the number of components is conspicuously reduced and the arrangement is simplified.

In comparison to extending two hoses from the secondary master cylinder 18, only a single hose is extended according to the present invention, the handling of the hoses is simplified and the outer appearance near to the front forks is improved.

The secondary master cylinder 18 is integrally formed with the caliper bracket 73 supporting the primary caliper 17.

In comparison with using a bolt or the like in order to mount the secondary master cylinder onto the caliper bracket, the integral forming of the secondary master cylinder 18 onto the caliper bracket 73 in according with the present invention reduces the number of components and improves the outer appearance near to the front forks.

FIG. 5 is a sectional view of the three-way mouth coupling. The three-way mouth coupling 36 has a first mouth 84 provided along the long axis 83 of a prism-shaped block 82. A second mouth 85 is provided orthogonally to the long axis 83.

A third mouth 86 is provided symmetrically to the second mouth 85. The three mouths 84, 85, 86 form a coupling which is connected by a T-shaped passage 87.

A mouthpiece 93 is provided on one end of the hose 88 connected to the first mouth 84. The mouthpiece 93 is provided with a bolt hole 89, an annular groove 91 and a projection 92. An L-shaped passage 95 is provided in a designated bolt 94.

The designated bolt 94 is screwed into the first mouth 84 of the three-way mouth coupling 36 through a seat ring 96 to the mouthpiece 93. At this time, if the projection 92 is restrained using a normal tool such as a nipper, the mouthpiece 63 will not rotate together with the designated bolt 94 and the process of threadable engagement can be performed smoothly.

This operation completes the connection of the hose 88.

After completion, a hydraulic pressure supplied by the hose 88 is supplied to the second mouth 85 and the third mouth 86 through the annular groove 91, the L-shaped passage 95 and the T-shaped passage 87.

Figure 6:
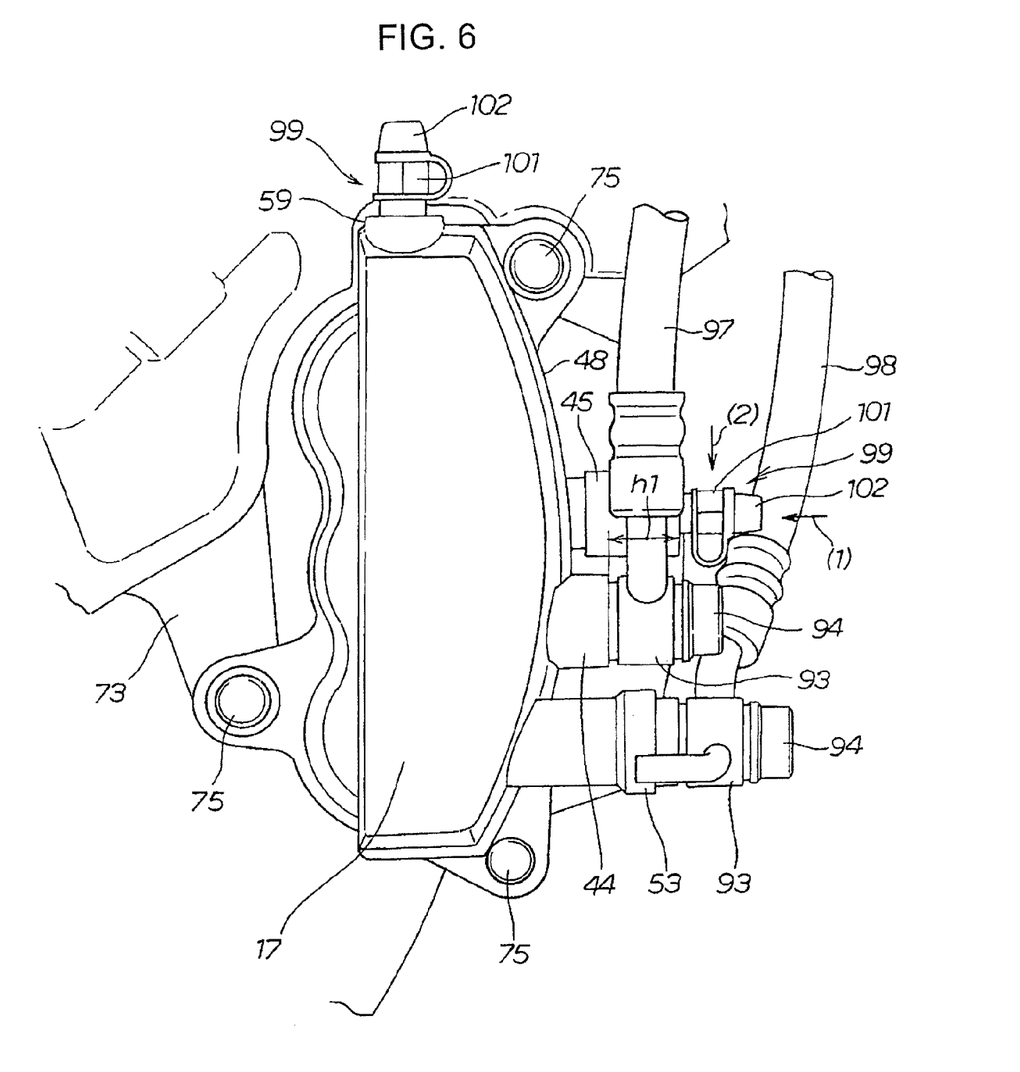

FIG. 6 shows arrangement of the primary caliper and the hoses and the like. The mouthpiece 93 of the first brake hose 97 is connected using a designated bolt 94 to the first hose connection mouth 44. The mouthpiece 93 of the second brake hose 98 is connected using a designated bolt 94 to the adjacent second hose connection mouth 53. An air valve 99 which closes when tightened and opens when loosened is threadably engaged with the opposite adjacent first air discharge mouth 45.

The tip of the first air discharge mouth projects by a distance h1 to a higher position than the tip of the first hose connection mouth 44. The first brake hose 97 extends along the outer face 48 of the primary caliper 17.

When the difference of elevation h1 is substantially equal to the thickness of the mouthpiece 93, as shown in the figure, a tool engagement section 101 can be seen directly from the side of the vehicle body.

When discharging air, a resin cap 102 is removed, a tool is applied to the tool engagement section 101, and rotated so as to place the valve in an open position.

The tool may be a normal tool such as a box wrench, spectacle wrench or a spanner. In other words, a box wrench or spectacle wrench may be engaged with the tool engagement section 101 as shown by the arrow (1). When a spanner is used, it is engaged with the tool engagement section 101 as shown by the arrow (2). In either case, the first brake hose 97 is not an obstacle.

Since the tool engagement section 101 is higher than the first brake hose 97, even when the tool engaged with the tool engagement section 101 swings, the first brake hose 97 is not an obstacle thus allowing simple opening and closing operations of the air valve 99 and simple handling of the resin cap 102.

When the tool engagement section 101 is formed with a polygonal sectional face, the tool can be engaged. However since normal tools are typically adapted for use with hexagonal bolts, the shape of the tool engagement section 101 preferably has a hexagonal sectional face.

The second air discharge mouth 59 is mounted facing upwardly or may be inclining upwardly. In this manner, air can be rapidly discharged.

The disk brake device of the present invention is adapted to a two-wheeled vehicle in this embodiment. However it can be applied to a three wheeled vehicle or a general vehicle.

The disk brake device according to this invention is preferably applied to a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk brake device comprising:
three cylinders in parallel on a caliper of a disk brake, the cylinders provided with pistons pressing a brake pad onto a disk plate;
a first air discharge and a first brake hose connected to a center cylinder; and
a second air discharge and a second brake hose connected to side cylinders on both sides,
wherein a first hose connection mouth connecting the first brake hose, and a first air discharge mouth connecting the first air discharge projecting from an outer face of the caliper are in close proximity so that an axis of the first hose connection mouth and an axis of the first air discharge mouth are arranged in parallel; and
a difference in elevation is provided on both tip end faces so that the tip end face of the first air discharge mouth is higher than the tip end face of the first hose connection mouth,
wherein an air valve is threadably engaged with the first air discharge mouth which closes when tightened and opens when loosened; and
a tool engagement section is in a higher position than the tip end face of the first air discharge mouth.

2. The disk brake device according to claim 1,
wherein when a front side cylinder and a rear side cylinder comprising the side cylinders on both sides are viewed from a side in alignment,
the front side cylinder and the rear side cylinder are connected by a connection passage; and
the second air discharge having a second air discharging mouth for discharging air from the connection passage projects in a forward direction from the caliper at a position forward of the front side cylinder.

3. The disk brake device according to claim 2, wherein a recess is provided rearwardly of the front side cylinder, and another recess is provided rearwardly of a rear side cylinder, and the connection passage connects the recesses.

4. The disk brake device according to claim 1, wherein the tool engagement section is formed in a hexagonal shape in order to allow engagement of a wrench.

5. The disk brake device according to claim 1, wherein the first brake hose extends along an outer side of the caliper in a forward direction from the first hose connection mouth.

6. The disk brake device according to claim 1, wherein the first brake hose includes a mouthpiece connected to the first hose connection mouth, and since the difference of elevation h1 is substantially equal to a thickness of the mouthpiece, and the tool engagement section can be seen directly from a vehicle body side.

7. A disk brake device comprising:
three cylinders in parallel on a caliper of a disk brake, the cylinders provided with pistons pressing a brake pad onto a disk plate;
a first air discharge and a first brake hose connected to a center cylinder; and
a second air discharge and a second brake hose connected to side cylinders on both sides,
wherein a first hose connection mouth connecting the first brake hose, and a first air discharge mouth connecting the first air discharge projecting from an outer face of the caliper are in close proximity so that an axis of the first hose connection mouth and an axis of the first air discharge mouth are arranged in parallel; and
a difference in elevation is provided on both tip end faces so that the tip end face of the first air discharge mouth is higher than the tip end face of the first hose connection mouth,
wherein the second air discharge includes a second air discharge mouth having an axis that is substantially perpendicular to the axis of the first air discharge mouth,
wherein an air valve is threadably engaged with the first air discharge mouth which closes when tightened and opens when loosened; and
a tool engagement section is in a higher position than the tip end face of the first air discharge mouth.

8. The disk brake device according to claim 7, further comprising a second hose connection mouth connected to a rear one of the side cylinders so that an axis of the second hose connection mouth is parallel to the axis of the first hose connection mouth.

9. The disk brake device according to claim 8, wherein a difference of elevation h2 is provided between a tip end face of the second air connection mouth and the tip end face of the first hose connection mouth, and
the tip end face of the second air connection mouth is higher than the tip end face of the first hose connection mouth.

10. The disk brake device according to claim 8, wherein the difference of elevation h2 is smaller than the difference of elevation h1.

11. The disk brake device according to claim 7,
wherein when a front side cylinder and a rear side cylinder comprising the side cylinders on both sides are viewed from a side in alignment,
the front side cylinder and the rear side cylinder are connected by a connection passage; and
the second air discharge discharging air from the connection passage projects in a forward direction from the caliper at a position forward of the front side cylinder.

12. The disk brake device according to claim 11, wherein a recess is provided rearwardly of the front side cylinder, and another recess is provided rearwardly of a rear side cylinder, and the connection passage connects the recesses.

13. The disk brake device according to claim 7, wherein the tool engagement section is formed in a hexagonal shape in order to allow engagement of a wrench.

14. The disk brake device according to claim 7, wherein the first brake hose extends along an outer side of the caliper in a forward direction from the first hose connection mouth.

15. The disk brake device according to claim 7, wherein the first brake hose includes a mouthpiece connected to the first hose connection mouth, and since the difference of elevation h1 is substantially equal to a thickness of the mouthpiece, and the tool engagement section can be seen directly from a vehicle body side.

16. A disk brake device comprising:
three cylinders in parallel on a caliper of a disk brake, the cylinders provided with pistons pressing a brake pad onto a disk plate;
a first air discharge and a first brake hose connected to a center cylinder; and
a second air discharge and a second brake hose connected to side cylinders on both sides,
wherein a first hose connection mouth connecting the first brake hose, and a first air discharge mouth connecting the first air discharge projecting from an outer face of the caliper are in close proximity so that an axis of the first hose connection mouth and an axis of the first air discharge mouth are arranged in parallel; and a difference in elevation is provided on both tip end faces so that the tip end face of the first air discharge mouth is higher than the tip end face of the first hose connection mouth, further comprising a second hose connection mouth connected to a rear one of the side cylinders so that an axis of the second hose connection mouth is parallel to the axis of the first hose connection mouth, wherein a difference of elevation h2 is provided between a tip end face of the second air connection mouth and the tip end face of the first hose connection mouth, and the tip end face of the second air connection mouth is higher than the tip end face of the first hose connection mouth.

17. The disk brake device according to claim 16, wherein the difference of elevation h2 is smaller than the difference of elevation h1.

* * * * *